Oct. 25, 1949.   P. F. DONAHUE   2,485,960
PIPE JOINT
Filed Oct. 11, 1944
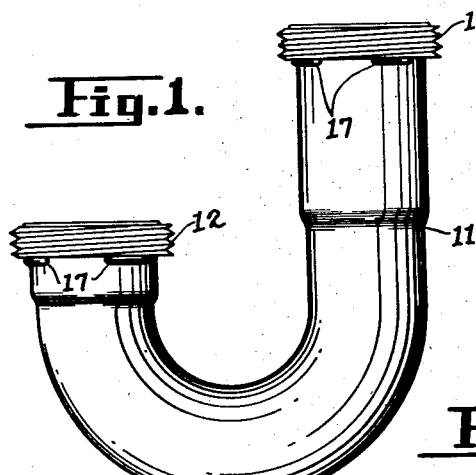
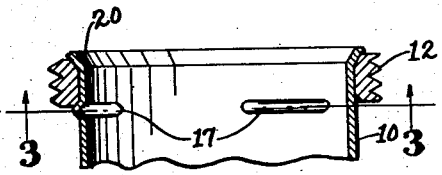
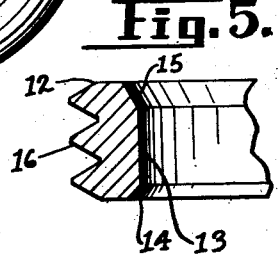
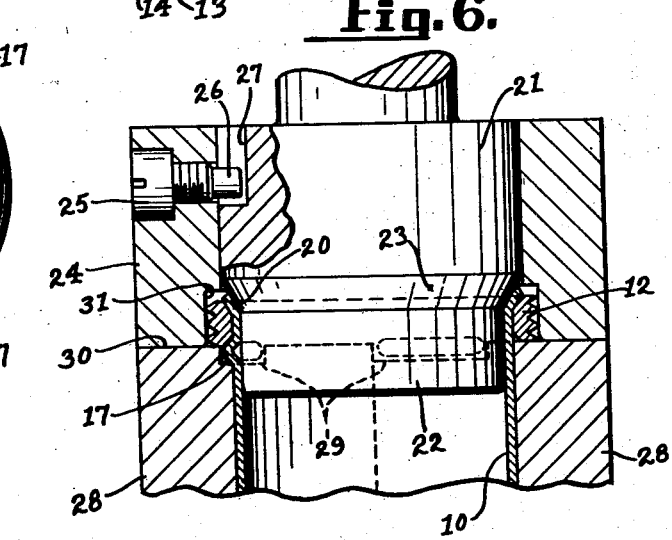
INVENTOR.
Patrick F. Donahue
BY
H. F. Johnston Patented Oct. 25, 1949

2,485,960

UNITED STATES PATENT OFFICE 2,485,960

PIPE JOINT

Patrick F. Donahue, Waterbury, Conn., assignor to Scovill Manufacturing Company, Waterbury, Conn., a corporation of Connecticut Application October 11, 1944, Serial No. 558,228

5 Claims. (Cl. 285—120)

This invention relates to pipe connections and particularly to the coupling end construction of a tubular pipe such as may be used in the plumbing trade in installing the drainage system of lavatory bowls, bath tubs, sinks and the like and the method of manufacturing the same.

It is customary to make such connections from thin metal tubular stock and to attach to the coupling end a threaded bushing of heavier material which may be made as a forging or die casting but preferably from heavy tubing as a screw machine product and machined to the proper configuration to fit the end of the tube and to provide for a standard coupling thread. In the act of anchoring such a threaded ring or bushing to the end of a tubular pipe, it has been customary to provide a seat adjacent the end of the tube in the form of an axially outwardly collapsed continuous circumferential double wall flange positioned a predetermined distance from the open end of the tube to serve as a shoulder for the bushing. In forming such a shoulder flange to the end of the tube it has been necessary to firmly grip the outer wall of the tube adjacent the position where the flange is to be formed to such a degree that the gripping force of the tool necessarily had to be so great to prevent slippage of the tube that it would severely bite into the metal of the thin wall tube and actually rupture the metal contiguous to the position where the innermost wall of the flange joins the wall of the tube.

To overcome the above objections of manufacture it is the object of this invention to provide a plurality of interrupted elongated circumferential beads or nibs on the outside of the tube that can be formed radially outwardly from the interior of the tube.

Another object of the invention is to form the exterior wall of the nibs and particularly the outer uppermost one on an angle conformable to the beveled angle provided on the adjacent end of the threaded bushing, so as to provide for a complementary seat between the assembled parts.

Another object is in the method of assembling the bushing to the end of the tube wherein there is provided a tool with shoulders that will support the threaded bushing intermediate the length of the elongated nibs so as to prevent too severe strains upon that portion of said ring that bridges between the nibs as well as to prevent the ring from jamming against the nibs coincident with the forming of the securing flange at the end of the connecting tube.

The full nature of this invention along with other objects and various advantages thereof will be more apparent from a consideration of the following description in connection with the accompanying drawing, in which—

Fig. 1 is a side elevational view of a conventional J-bend such as used in a trap installation having a threaded bushing attached to both ends thereof in a manner embodying this invention.

Fig. 2 is a sectional view of one end of a tubular connection.

Fig. 3 is a transverse sectional view taken along the line 3—3 of Fig. 2.

Fig. 4 is a fragmentary sectional view of one portion of the end tubular joint considerably enlarged to more intimately show the details of construction.

Fig. 5 is a fragmentary sectional view of the threaded ring bushing, per se, and Fig. 6 is a sectional view of the tubular connection and showing the tools that are employed for the purpose of flaring the end of the tube in assembling the ring bushing thereto.

Referring now to the drawing wherein like reference numerals refer to like parts throughout the several views, the numeral 10 refers to a tubular pipe which may be the end of a drainage connection such as a J-bend 11 shown in Fig. 1 with threaded ring bushings 12 circumventing each end of the tube and permanently attached there in place.

As pointed out in the objects of the invention it is the practise to make plumbing connections of the character of this invention from relatively thin wall tubular material, and to provide a ring bushing of a thickness capable of being formed with a relatively coarse thread sufficient to withstand the joint connection with a swiveling coupling nut carried by a connecting member not shown. The threaded ring bushing 12 may be made as a die casting or forging, but preferably it is made from relatively heavy tubing and machined to specified dimensions as a screw machine product, which bushing is then permanently anchored or secured to the end of the tube 10 or to both ends of the J-bend connection such as 11. The specific construction employed in providing such an anchorage between the ring bushing 12 and the end of the thin wall tube 10 is the purpose of this invention.

In presenting now the more intimate details of the construction the inner cylindrical wall 13 of the bushing 12, representing its smallest diameter, is designed to be made slightly larger than the outside diameter of the pipe 10 so as to have a free slip fit thereover. The end of the tube 10 before it is distorted, as shown by dotted outline in Fig. 4, has its terminal edge cut on a bevel tapering upwardly from the exterior as indicated at 10a for the purpose of eliminating burrs and to facilitate the guiding of the ring bushing 12 thereover.

The lower interior edge of the ring bushing 12 is provided with a beveled seat or surface 14 formed preferably on an angle of 45°. The upper interior edge of the bushing 12 is likewise formed with a beveled surface 15 and to a greater extent than the opposite bevel 14 and preferably on an angle of 30° to the axis of the bushing. The purpose of these beveled surfaces 14 and 15 will appear later. The exterior surface of the bushing 12 is provided with an exterior thread 16 of a relatively coarse nature and made in accordance with the standards of the plumbing trade to fit a complementary union nut (not shown) on the part to be connected thereto.

Placed a predetermined distance from the open end of the tube 10 is a plurality of exterior elongated circumferential nibs or beads 17 that in this instance are shown to be three in number and preferably made of a length to extend substantially through an arc of 60° on the outer wall of the tube 10 with the space in between consequently of similar length. The transverse section of each bead 17, as best shown in Fig. 4, is formed with a rounding crest 18 that merges into tangential opposed diverging relatively flat beveled surfaces 19 disposed at an angle of 45° to the wall of the tube 10, and joins to said tube wall at a relatively distinct angle as at 17a. While the diverging beveled surfaces 19 on both sides of the bead are shown as formed on a 45° angle it is to be understood that it is only essential that the upper surface be disposed at 45° and the lower surface may be at any angle that will be most convenient for manufacture. The need of having the upper surface of the bead set at 45° is to serve as a seat or shoulder and be complemental to the lower inner beveled surface 14 of the ring bushing 12.

When the bushing ring is assembled over the end of the tube 10 its lower beveled seat 14 comes to rest against the plurality of elongated beads 17 and seats solidly against the upper beveled surface 19. The ring bushing 12 is anchored permanently in place by forming or flaring the end of the tube outwardly at 20 in a diverging manner complementary to the adjacent and upper beveled surface 15 of said ring bushing.

The tools that are employed for accomplishing the flaring of the tube 10 and at the same time providing a mechanism that will not distort the elongated beads 17 or the ring bushing 12 coincident with the formation of the tube anchoring flange 20 is shown in Fig. 6. In the construction of the assembly tool there is employed a punch 21 having a reduced leading end 22 with an interposed beveled surface 23 therebetween. The diameter of the leading reduced end 22 of the punch 21 is of a size to snugly fit into the interior diameter of the tube 10 so as to prevent any portion of the interior tube wall in the region of the beads 17 from collapsing inwardly during the flange (20) forming operation.

To preclude the bushing ring 12 from expanding and causing any distortion of the threaded portion 16, I provide a retaining collar 24 that is slidably carried by the punch as by means of a set screw 25 threaded into the collar and having a reduced nose 26 slidably engaging in a slot 27 provided in the wall of the punch 21. To support the tube 10 and at the same time prevent the walls of the beads 17 from being distorted or bent out of their normal shape due to the force of the descending punch 21 in beveling the end of the tube 10 outwardly and downwardly upon the ring 12, a pair of split jaws 28 are provided that move laterally inwardly to embrace the tube 10 immediately below the beads 17, and have its upper surface 30 disposed slightly above a plane in line with the crest 18 of the beads 17. Recesses 29 are provided in the inner upper edges of the jaws 29 of a character to receive the beads 17 and with the inner edge of the recess base disposed snugly within the angle 17a where the lower bead surface joins into the outer wall of the tube proper to prevent downward slippage of said tube 10.

The fact that the upper surface 30 of said jaws are disposed on a plane to receive the under or adjacent surface of the threaded bushing 12 serves to support it against jamming down upon the beads 17 coincident with the attaching operation of the tool. The collar 24 is provided with an interior recess 31 of a size to accommodate the threaded portion 16 of the ring 12. As the punch 21 descends carrying the collar 24 with it, the collar 24 will first be caused to slip over the threaded surface of the ring bushing 12, by reason of the recess 31, and come to rest upon the upper surface 30 of the jaws 28. Further descent of the punch will bring the intermediate beveled surface 23 into engagement with the end of the tube 10 and flare it outwardly at 20 on an angle comparable to the angle of the upper bevel 15 of the bushing 12 and thus permanently anchor the ring 12 to the tube 10. Any tendency to distort the ring 12 by reason of the downward stroke of the punch 21 in forcing the flared end 20 of the tube 10 outwardly upon said ring is prevented due to the reception of the threaded portion 16 within the sleeve recess 31.

While there has been herein described and upon the drawing shown an illustrative embodiment of the invention, it is to be understood that the invention is not limited thereto but may comprehend other constructions and arrangements without departing from the spirit of the invention and the scope of what is claimed.

I claim:

1. A joint connection for the end of a tubular pipe of relatively thin wall thickness, a plurality of elongated circumferential spaced beads or nibs formed radially out of the wall of said pipe adjacent one end and from the interior thereof, said beads having a rounding apex merging into substantially flat beveled surfaces diverging from said apex, a threaded ring bushing adapted to slip over the outer end wall of said tube and provided with a beveled seat complemental to and adapted to seat against the upper beveled surface of said beads, and the upper end of the tubular pipe flared outwardly over the outer end of the ring bushing for permanently anchoring said ring bushing to said pipe, said beads forming individual and interrupted gripping medium for said bushing to hold said bushing against rotation relative to said pipe.

2. A joint connection for the end of a tubular pipe of relatively thin wall thickness, a plurality of elongated circumferentially spaced beads formed radially out of the wall of said pipe adjacent one end and from the interior thereof, said beads being of a length and so spaced as to provide for relatively wide uninterrupted portions on said pipe between the adjacent ends of said beads, a threaded ring bushing adapted to slip over the outer end wall of said tube and seat against said beads, and the upper end of the tubular pipe being flared outwardly against said bushing to prevent axial removal, said beads forming individual and interrupted gripping medium for said bushing to hold the same against relative rotation to said pipe.

3. A joint connection for the end of a tubular pipe of relatively thin wall thickness, a plurality of elongated circumferential spaced beads or nibs formed radially out of the wall of said pipe adjacent one end and from the interior thereof, said nibs having a rounded apex and connecting into a tangential upper substantially flat surface inclined to the wall of the tube and joining to the wall of said tube at a distinct angle, a threaded ring bushing adapted to slip over the outer end wall of said tube and provided with a beveled seat complemental to and adapted to seat against the upper beveled surface of said nibs, and the upper end of the tubular pipe flared outwardly over the outer end of the ring bushing for permanently anchoring said bushing to said pipe, said nibs forming individual and interrupted gripping medium for said bushing to hold said bushing against rotation relative to said pipe.

4. A joint connection for the end of a tubular pipe of relatively thin wall thickness, a plurality of elongated circumferential spaced beads or nibs formed radially out of the wall of said pipe adjacent one end and from the interior thereof, said nibs having a rounding apex merging into substantially flat beveled surfaces diverging from said apex, a threaded ring bushing adapted to slip over the outer end wall of said tube and provided with a beveled seat complemental to and adapted to rest against the upper beveled surface of said nibs, the upper end of said ring bushing also provided with a beveled surface, and the end of the tubular pipe being flared outwardly against the upper beveled surface of said bushing as a means of anchoring the latter permanently into position, said nibs forming individual and interrupted gripping medium for said bushing to hold said bushing against rotation relative to said pipe.

5. A joint connection as defined by claim 4 wherein the elongated nibs are substantially as long as the space interposed between their adjacent ends.

PATRICK F. DONAHUE.

REFERENCES CITED

The following references are of record in the file of this patent:

UNITED STATES PATENTS

| Number | Name | Date |
| --- | --- | --- |
| 384,114 | Barry | June 5, 1888 |
| 839,090 | Ayer | Dec. 25, 1906 |
| 1,533,886 | Mueller | Apr. 11, 1925 |
| 1,647,447 | Hartnett | Nov. 1, 1927 |
| 1,724,509 | Nelson | Aug. 13, 1929 |
| 1,876,914 | Gordon | Sept. 13, 1932 |
| 1,951,833 | Maupin | Mar. 20, 1934 |
| 1,964,630 | Hanlan | June 26, 1934 |
| 2,165,622 | Donahue | July 11, 1939 |
| 2,165,631 | Donahue | July 11, 1939 |
| 2,188,422 | Waver | Jan. 30, 1940 |
| 2,277,410 | Neukirch | Mar. 24, 1942 |
| 2,350,054 | McIntosh | May 30, 1944 |
| 2,399,790 | Conroy | May 7, 1946 |